(12) United States Patent
Myers et al.

(10) Patent No.: US 8,390,328 B2
(45) Date of Patent: Mar. 5, 2013

(54) SUPPLYING A CLOCK SIGNAL AND A GATED CLOCK SIGNAL TO SYNCHRONOUS ELEMENTS

(75) Inventors: James Edward Myers, Bottisham (GB); David Walter Flynn, Cambridge (GB); Robert Campbell Aitken, San Jose, CA (US); Marlin Wayne Frederick, Jr., Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/067,184

(22) Filed: May 13, 2011

(65) Prior Publication Data

US 2012/0286824 A1    Nov. 15, 2012

(51) Int. Cl.
*H03K 19/00* (2006.01)
(52) U.S. Cl. ......................................................... 326/93
(58) Field of Classification Search ............... 326/93–98
See application file for complete search history.

(56) References Cited

U.S. PATENT DOCUMENTS

| | | | |
|---|---|---|---|
| 5,926,487 A | 7/1999 | Chappell et al. | |
| 5,973,529 A | 10/1999 | Chappell et al. | |
| 6,437,623 B1 | 8/2002 | Hsu et al. | |
| 6,788,122 B2 | 9/2004 | Jones, Jr. | |
| 6,809,556 B1 * | 10/2004 | Bronfer et al. | 327/99 |
| 7,279,935 B2 * | 10/2007 | Hamdan et al. | 326/93 |
| 7,323,909 B2 * | 1/2008 | Mamidipaka | 326/93 |
| 7,391,250 B1 * | 6/2008 | Chuang | 327/211 |
| 7,650,524 B2 | 1/2010 | Frederick, Jr. et al. | |
| 7,750,680 B2 * | 7/2010 | Mamidipaka | 326/93 |
| 2002/0186040 A1 | 12/2002 | Ooishi | |
| 2003/0218231 A1 | 11/2003 | Sani et al. | |
| 2005/0024121 A1 | 2/2005 | Marshall et al. | |
| 2007/0210833 A1 * | 9/2007 | Hamdan et al. | 326/93 |
| 2008/0219075 A1 * | 9/2008 | Ito et al. | 365/222 |
| 2009/0115469 A1 * | 5/2009 | Cortadella et al. | 327/142 |
| 2010/0238750 A1 * | 9/2010 | Ito et al. | 365/222 |

FOREIGN PATENT DOCUMENTS

| | | |
|---|---|---|
| EP | 1 130 778 | 9/2001 |
| EP | 1 220 450 | 7/2002 |
| WO | WO 01/65345 | 9/2001 |

OTHER PUBLICATIONS

Mahmoodi-Meimand et al., "Data-Retention Flip-Flops for Power-Down Applications", ISCAS, (2004), pp. 11-677 to 11-680.
S. Shigematsu et al, "A 1-V High-Speed MTCMOS Circuit Scheme for Power-Down Application Circuits" *IEEE Journal of Solid-State Circuits*, vol. 32, No. 6, Jun. 1997, pp. 861-869.
Translation of Chinese official action, Dec. 26, 2008, in Chinese Application No. 200680018359.5.

* cited by examiner

*Primary Examiner* — Thienvu Tran
(74) *Attorney, Agent, or Firm* — Nixon & Vanderhye P.C.

(57) ABSTRACT

A clock gating circuitry is configured to receive a clock signal and to output an output signal comprising either the clock signal or the predetermined gated value. The circuitry receives a clock signal, a clock enable signal having either an enable value or a disable value, and a power mode signal having either a low power value (indicating entry to a low power mode in which at least a portion of the plurality of synchronous elements are powered to retain data and are not clocked and at least a further portion of the plurality of synchronous elements are powered down), or a functional mode value (indicating the plurality of synchronous elements are to be powered). A clock gating unit has logic circuitry that is configured to output the clock signal or the predetermined gated value depending upon the low power value and the functional mode value.

24 Claims, 7 Drawing Sheets

SUPPLYING A CLOCK SIGNAL AND A GATED CLOCK SIGNAL TO SYNCHRONOUS ELEMENTS

BACKGROUND OF THE INVENTION

1. Field of the Invention

The field of the invention relates to the field of data processing and in particular, to reducing power consumption in data processing circuitry by gating the clock signal supplied to portions of the circuitry when they are not active.

2. Description of the Prior Art

In many circuits, particularly those that run off remote power supplies such as batteries, it is important to keep the power consumption of the circuits low. One way of doing this has been to gate the clock signal supplied to synchronous elements when they are not operational. The clock signal consumes a lot of power in a circuit and thus, being able to gate it in certain parts of the circuit that do not require it can save a significant amount of power.

In modern circuits a clock signal is often supplied to several synchronous elements via a clock gating cell. These cells are controlled by their own clock enable signal and in response to this either supply the clock signal to the synchronous elements or gate the clock signal. In this way the synchronous elements can either be clocked or not and power can be saved.

A further way of saving power is to provide a circuit with a sleep mode so that it is in effect powered down during non-operational periods.

Although this results in substantial power savings it also results in a loss of state within the circuitry. If it is desired that the circuit retain state during sleep mode, data retention circuits such as special data retention flip-flops must be used within the design. Such a mode of operation allows the stored signal values to be securely held in a small portion of the circuitry whilst the remainder of the circuitry is powered down for leakage reduction purposes. When power is resumed, the saved signal value is restored and operation continues. One approach to supporting data retention in this way is to add balloon latches to the flip-flops such that signal values can be transferred into the balloon latches which have their own power supply, and then the power supply removed from the remainder of the flip-flops. A disadvantage of this approach is that the balloon latches consume considerable additional circuit area.

Other designs have used master slave flip flops where the slave is powered during sleep mode and retains the state while the master is powered down. In order to avoid the slave losing state the transmission gate between the master and slave must be in the isolated or closed state for the whole period that the master is powered down. This requires a control signal to be sent to each transmission gate and has significant routing overheads.

It would be desirable to be able to reduce power consumption while retaining state without undue area or signal routing overheads.

SUMMARY OF THE INVENTION

A first aspect of the present invention provides a clock gating circuitry unit for supplying either a clock signal or a predetermined gated value to a plurality of synchronous elements within an integrated circuit, said integrated circuit comprising said plurality of synchronous elements and combination circuitry, said clock gating circuitry being configured to receive a clock signal and to output an output signal comprising either said clock signal or said predetermined gated value, said clock gating circuitry unit comprising: a clock input for receiving a clock signal; a clock enable signal input for receiving a clock enable signal having either an enable value indicating said plurality of synchronous elements are currently functional and are to be clocked, or a disable value indicating said plurality of synchronous elements are currently not required and are not to be clocked; a power mode signal input for receiving a low power mode signal having either a low power value indicating entry to a low power mode in which at least a portion of said plurality of synchronous elements are powered to retain data and are not clocked and at least one of a further portion of said plurality of synchronous elements and at least a portion of said combinational circuitry are powered down, or a functional mode value indicating said plurality of synchronous elements are to be powered; logic circuitry configured in response to said clock enable signal having said enable value and to said low power mode signal having said functional mode value to output said clock signal and in response to at least one of said clock enable signal having said disable value and said low power mode signal having said low power value to output said predetermined gated value; and output buffer circuitry for receiving a signal output by said logic circuitry and for outputting said output signal.

The present invention recognises that circuitry that is required to gate the clock signal to particular elements when they are not operational in response to the clock enable control signal could also with a little redesign be used to send a gated clock signal to these elements in response to a low power mode signal. When entering a low power mode where sections of the circuitry are powered down some sections retain power so that they can retain state. Synchronous elements are generally designed to have state clocked in and out of them. Providing a predetermined gated clock value to such elements may enable them to retain the state securely when surrounding elements are powered down.

For example, if the sections used to retain state are elements such as latches then it is important that these have their inputs isolated from the elements that are powered down to avoid them losing state. These elements are often designed with transmission gates on their inputs so that they are isolated or transmit in response to a clock signal, so that the state is clocked in and out of these elements. The ability to provide a clock signal held at a predetermined value to such a transmission gate enables the state held in the latch to be held securely during low power mode. In this way, the clock gating circuitry of the present invention can be used both to provide a gated clock signal in response to a clock disable signal and to provide a gated clock signal in low power mode, thereby reducing area and routing overheads.

In some embodiments, said clock gating circuit further comprises latching circuitry configured to latch said received clock enable signal and to output said latched clock enable signal to said logic circuitry.

The clock enable signal is generated by processing elements within the circuitry and may decay with time. Thus, in some embodiments latching circuitry is used to hold this signal at its predetermined value in order to maintain the clock signal in its gated state. The low power mode signal by contrast is generated by other power control circuitry and does not need to be latched.

In some embodiments the clock gating circuitry further comprises an output buffer for outputting said clock signal or said predetermined gated value.

An output buffer is useful for supplying a reliable signal to the synchronous elements. However, it has a disadvantage of taking a lot of area and power.

In some embodiments, the clock gating circuitry unit is configured to receive power from two power supply means, at least some circuitry within said clock gating circuitry unit receiving power from a first power supply means and at least some other circuitry within said clock gating circuitry unit receiving power from a second power supply means, said second power supply means being configured not to supply power to said at least some other circuitry in said low power mode.

The number of synchronous elements that a clock gating circuitry unit controls may be selected depending on the degree of control required. In many embodiments there will be a significant number of clock gating circuitry units within an apparatus, each controlling a few synchronous elements. Thus, these elements themselves consume a not insignificant amount of power. It may therefore be advantageous when in low power mode to be able to power down at least some of the circuitry in each unit. In this regard embodiments of the present invention recognise that when in low power mode, the system must be able to respond to the low power mode signal, however, it no longer needs to respond to the clock enable signal in this mode and thus, it may be that portions of the unit that detect and respond to this signal can be powered down and the unit can still provide the gated clock signal as required.

In some embodiments, said predetermined gated value comprises a logical zero, said logic circuitry being powered by said first power supply means and other elements of said clock gating circuitry unit being powered by said second power supply means, wherein in said low power mode said first power supply means supplies power to said logic circuitry and said second power supply means does not supply power to said other elements such that said other elements are powered down.

In some embodiments it is only the logic circuitry within the clock gating circuitry unit that is powered up the other circuitry including the output buffer being powered down. This will provide the required functionality provided the gated value is a logical zero.

In some embodiments said clock gating circuitry further comprises output buffer circuitry comprising an inverter for receiving a signal output by said logic circuitry and for outputting said output signal and said predetermined gated value comprises a logical one, and said first and second power supply means each comprise a high voltage rail and a low voltage rail, said logic circuitry being powered by said first power supply means and other elements of said clock gating circuitry unit being powered by said second power supply means, said low voltage rail of said second power supply means being isolated from a low voltage supply in said low power mode.

Although in many embodiments the predetermined gated value of the clock signal will be a logical zero, in some embodiments it may be a logical one. This latter case can be advantageous where the second power supply is gated using footer devices. In such a case if a gated value of a logical one is required, then the circuitry within the clock gating circuitry that can be powered down can include the more power hungry elements such as the inverter output buffer.

In some embodiments, said predetermined gated value comprises a logical zero and said output buffer comprises an inverter, and said first and second power supply means each comprise a high voltage rail and a low voltage rail, said first power supply means supplying power to said output buffer within said clock gating circuitry units, and said second power supply supplying power to other elements within said clock gating circuitry unit, said low voltage rail of said second power supply means being isolated from a low voltage supply in said low power mode.

In the case that the power is supplied via power rails and it is the low power rail that is gated in low power mode then it can be the output buffer that is powered and the logic circuitry that is powered down. Powering down the logic circuitry in such an instance will mean that a logical 1 is output from this logic circuitry as it is the low power voltage rail that is disconnected. Thus, the inverter will output a logical zero in response to this logical one. It should be noted that this is not as power efficient as powering down the output buffer and powering up the logic circuitry as generally the output buffers are large and have quite high power leakage.

In some embodiments, the clock gating circuitry unit further comprises a test mode enable signal input for receiving a test mode enable signal indicating entry to a test mode and combining circuitry for combining said test mode enable signal and said clock enable signal, wherein in response to either said test mode enable signal having said test mode enable value or said clock enable signal having said enable value said combined value has a value of said enable value; and latching circuitry configured to latch said combined signal and to output said latched combined signal to said logic circuitry.

In the case that the circuitry is configured to respond to a test mode enable signal then this may be combined with a clock enable signal in such a way that either one of them having the enable value will cause the logic circuitry to output the clock signal and if they are both disabled the predetermined gated value will be output.

In some embodiments, the clock gating circuitry unit further comprises overriding circuitry, said overriding circuitry being configured in response to said test mode enable signal having said test mode enable value to override said low power mode signal input to said logic circuitry and to hold said signal at said functional mode value.

If the clock gating circuitry unit is configured to supply a clock signal in test mode then the low power mode signal must be overridden in test mode to prevent it interfering with operation of the test mode. In such a case overriding circuitry is used so that during the test mode, the low power mode signal is held at the functional mode value.

Although the logic circuitry can be formed in a number of ways provided it provides the required functionality, a convenient and area efficient way of forming it is with a NAND gate and with the output buffer being an inverter. In some embodiments the output buffer may comprise the NAND gate.

A second aspect of the present invention provides an integrated circuit comprising: synchronous elements clocked by a clock signal; combinational circuitry; a plurality of clock gating circuitry units according to a first aspect of the present invention, each configured to provide either said clock signal or said gated predetermined value to a respective plurality of said synchronous elements; and power supply means configured to supply power to said synchronous elements and said plurality of clock gating circuitry units, said power supply means being configured such that in response to a signal indicating said low power mode said power supply means supplies power to a portion of said synchronous elements such that they retain data and does not supply power to at least one of a further portion of said synchronous elements and at least a portion of said combinational circuitry such that they are powered down; said plurality of clock gating circuitry units being configured in response to said low power mode signal having said low power value to supply said predetermined gated value to said portion of synchronous elements powered to retain data.

In some embodiments, said respective plurality of synchronous elements comprise state storage elements.

The synchronous elements that receive clock signals from this gating circuitry may be state storage elements. These are particular suited to having their clock signal gated when they are not actually switching value but are still powered so that they retain state. They may also be suited to retaining state in a lower power mode provided that they have their input isolated from other elements that may be powered down. A gated clock signal may be the ideal signal to perform this function.

In some embodiments, said power supply means comprises a first power rail for supplying power to said portion of said synchronous elements and a second power rail for supplying power to said further portion of said synchronous elements, wherein at least some circuitry within at least some of said plurality of clock gating circuitry units receive power from said first power rail and at least some other circuitry within said at least some of said plurality of clock gating circuitry units receive power from said second power rail, said second power rail being configured to be isolated from a power source and not to supply power said low power mode.

It may be advantageous if the integrated circuit has a first power supply rail for supplying power to certain portions and a second power rail for supplying power to other portions. In this way by powering down one of the power rails some of the integrated circuit can be powered down in a low power mode while other portions can retain power.

In some embodiments, said at least some other circuitry comprises said output buffer and said at least some circuitry comprises said logic circuitry, and said predetermined gated value comprises a logical zero.

It may be advantageous if the output buffer is powered down as this is often large and may have high power leakage. It may be that just the logic circuitry is required to retain power to enable the low power mode signal to generate the gated clock signal required.

In some embodiments, said at least some other circuitry comprises all circuitry within said at least some clock gating circuitry units other than said logic circuitry.

In addition to powering down the output buffer other elements in the clock gating circuitry units may be powered down in the low power mode.

In some embodiments, said integrated circuit further comprises overriding circuitry associated with a plurality of said clock gating circuitry units, said overriding circuitry being configured in response to said test mode enable signal having said test mode enable value to override said low power mode signal input to said plurality of clock gating circuitry units and to hold said signal at said functional mode value.

As noted previously, during test mode it is important that the clock signal is not gated by the low power mode signal and thus, overriding circuitry can be provided to hold the low power mode signal at the functional mode value. It may be advantageous if the integrated circuit has overriding circuitry associated with several clock gating circuitry units thereby reducing the area overhead associated with such circuitry.

A third aspect of the present invention provides a standard cell representing a functional component to be provided within a placement area of a predetermined size and having predetermined boundary conditions on an integrated circuit, said functional component being a clock gating component, said standard cell being configured to have: a clock signal input for receiving a clock signal; a clock enable signal input for receiving a clock enable signal having either an enable value indicating said plurality of synchronous elements are currently functional and are to be clocked, or a disable value indicating said plurality of synchronous elements are currently not required and are not to be clocked; a power mode signal input for receiving a low power mode signal having either a low power value indicating entry to a low power mode in which at least a portion of said plurality of synchronous elements are powered to retain data and are not to be clocked and at least one of: a further portion of said plurality of synchronous elements and combinational circuitry associated with said synchronous elements are powered down, or a functional mode value indicating said plurality of synchronous elements and said combinational are to be powered; logic circuitry configured in response to said clock enable signal having said enable value and to said low power mode signal having said functional mode value to output said clock signal and in response to at least one of said clock enable signal having said disable value and said low power mode signal having said low power value to output said predetermined gated value.

Clock gating units are often designed, built and sold as standard cells for supplying a clock signal to a number of other standard cells. The clock gating unit of the present invention requires very little additional circuitry when compared to a clock gating cell that gates a clock signal only in response to the clock enable signal and as such can also be formed as a standard cell. In this way a clock gating standard cell that can supply a clock signal or a gated clock signal in response to a clock enable signal and a low power mode signal is formed. Such a cell is suitable for use with standard state retention cells such a latching cells or flip flop cells, and can supply a clock signal during operational mode to these cells and can gate that clock signal when the cells are not themselves operational and can provide that gated signal in low power mode when some neighbouring cells may be powered down. In this way a standard cell that provides power savings by gating the clock in operational mode when the cells are not themselves switching and by gating the clock during standby mode when some of the cells are powered down is formed. There would be no additional routing requirements associated with the additional low power mode function when compared to the clock enable function.

A fourth aspect of the present invention provides a computer program on a non-transitory storage medium proving a standard cell according to a third aspect of the present invention.

A fifth aspect of the present invention provides a method of supplying either a clock signal or a predetermined gated value to a plurality of synchronous elements within an integrated circuit, said integrated circuit comprising said plurality of synchronous elements and combination circuitry, said method comprising: receiving a clock signal; receiving a clock enable signal having either an enable value indicating said plurality of synchronous elements are currently functional and are to be clocked, or a disable value indicating said plurality of synchronous elements are currently not required and are not to be clocked; receiving a low power mode signal having either a low power value indicating entry to a low power mode in which at least a portion of said plurality of synchronous elements are powered to retain data and are not to be clocked and at least one of a further portion of said plurality of synchronous elements and at least a portion of said combinational circuitry are powered down, or a functional mode value indicating said plurality of synchronous elements and said combinational circuitry are to be powered; in response to said clock enable signal having said enable value and to said low power mode signal having said functional mode value outputting said clock signal; and in response to at least one of said clock enable signal having said disable value and said low power mode signal having said low power value outputting said predetermined gated value.

A sixth aspect of the present invention provides clock gating means for receiving a clock signal and for outputting an output signal comprising either said clock signal or a predetermined gated value to a plurality of synchronous means for storing data within an integrated circuit, said integrated circuit comprising said plurality of synchronous elements and combinational circuitry, said clock gating means comprising: a clock input means for receiving a clock signal; a clock enable signal input means for receiving a clock enable signal having either an enable value indicating said plurality of synchronous elements are currently functional and are to be clocked, or a disable value indicating said plurality of synchronous elements are currently not required and are not to be clocked; a power mode signal input means for receiving a low power mode signal having either a low power value indicating entry to a low power mode in which at least a portion of said plurality of synchronous elements are powered to retain data and are not clocked and at least one of: a further portion of said plurality of synchronous elements and at least a portion of said combinational circuitry are powered down, or a functional mode value indicating said plurality of synchronous elements and said combinational circuitry are to be powered; logic means for outputting said clock signal in response to said clock enable signal having said enable value and to said low power mode signal having said functional mode value and for outputting said predetermined gated value in response to at least one of said clock enable signal having said disable value and said low power mode signal having said low power value.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
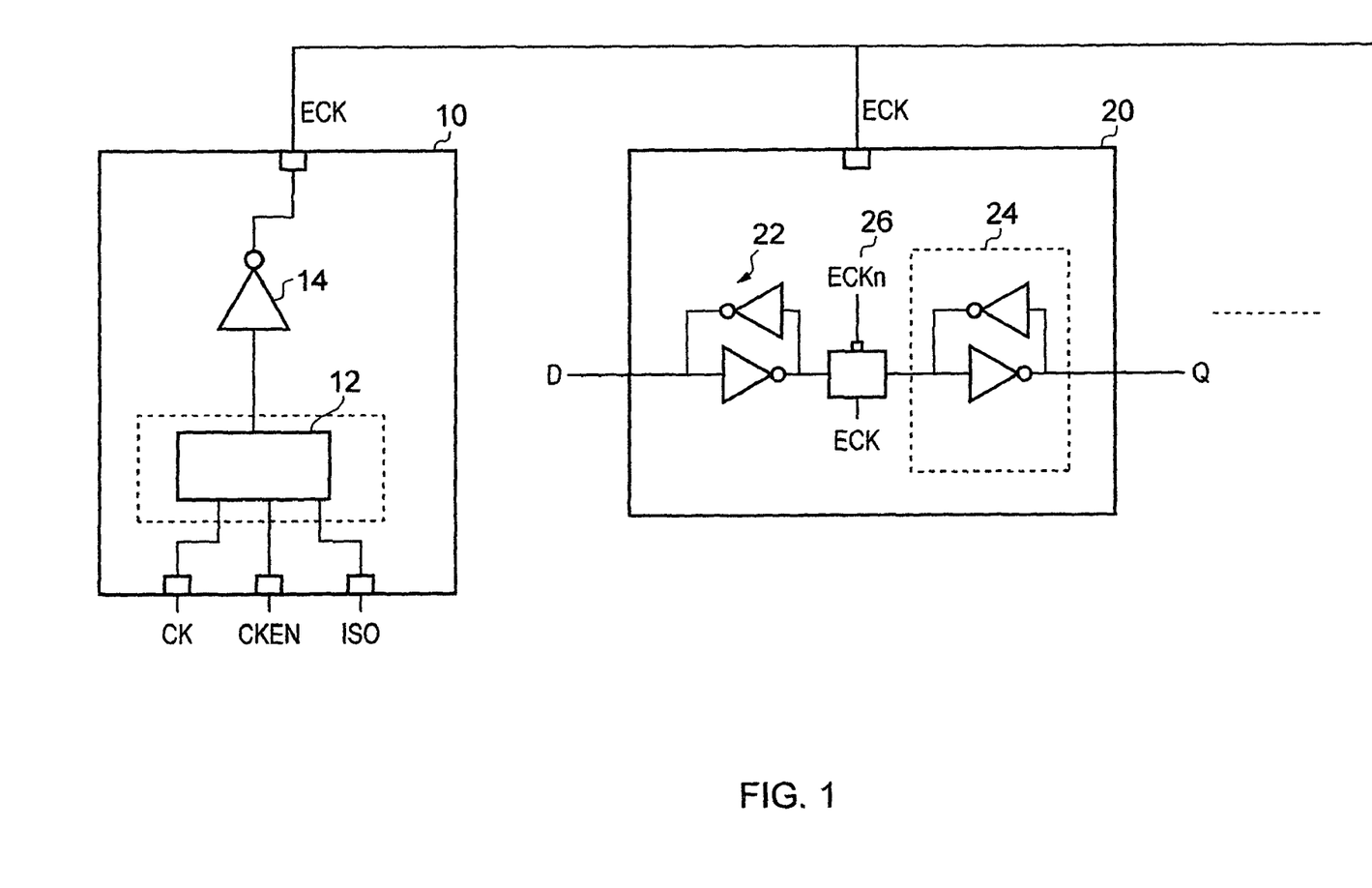
FIG. 1 shows a clock gating cell and a master slave flip-flop receiving its clock signal from this cell according to an embodiment of the present invention.

FIG. 1 shows a clock gating cell 10 supplying a clock signal ECK to a state retention circuit 20. In this embodiment state retention circuit 20 is a master slave flip-flop having a master latch 22 and a slave latch 24. These are separated from each other by transmission gate 26 which receives the clock signal ECK and transmits a data signal from the master latch 22 to the slave match 24 in response to the clock signal ECK being high and isolates the slave latch 24 from the master latch 22 in response to the clock signal ECK being low. In this figure elements surrounded by the non-continuous line are powered by a first power supply that is constantly powered while those not surrounded by the non-continuous line are powered by a second power supply that is powered down in a low power standby mode.

Clock gating cell 10 is formed of logic circuitry 12 which receives a clock signal CK a clock enable signal CKEN and a low power isolation signal ISO. It also has an inverter 14. Logic circuitry 12 is configured to output the clock signal CK in response to clock enable signal being enabled and the ISO signal indicating functional mode rather than low power mode. If either the clock enable signal CKEN is not enabled or the low power isolation signal ISO indicates low power mode then the clock signal is gated and a predetermined gated value is output from logic circuitry 12. In this embodiment the predetermined gated value is a logical one so that the inverter 14 will output a logical 0.

When the state retention circuit 20 receives the logical 0 at the clock signal input the transmission gate 26 switches to its non-transmission isolation mode. This ensures that the slave latch 24 does not receive state from the master latch 22 and as it is constantly powered will hold its current value. If the signal that caused the clock gating cell to gate the clock was the low power isolation mode signal ISO then subsequent to the clock signal being gated portions of the circuits will be powered down. In this embodiment, the output inverter 14 and the master latch 22 are powered down. As the gated clock signal is held at 0, 0 is still output from clock gating circuitry 10 and thus, transmission gate 26 is held in isolation mode and slave latch 24 retains its value.

If the gated clock signal was output in response to the clock enable signal being disabled then again the transmission gate 26 would be in its isolation non-conducting state and the slave and master latch would be isolated from each other. However, in this case no elements would be powered down and state would be retained but the state retention circuit would not be clocked.

In this way, clock gating cell 10 can provide power savings by gating the clock when the state retention elements 20 are not switching and by gating the clock in the low power mode where some elements are powered down. In the latter case, some of the elements within the clock gating circuitry itself are also powered down thereby increasing the power savings of this mode.

Figure 2:
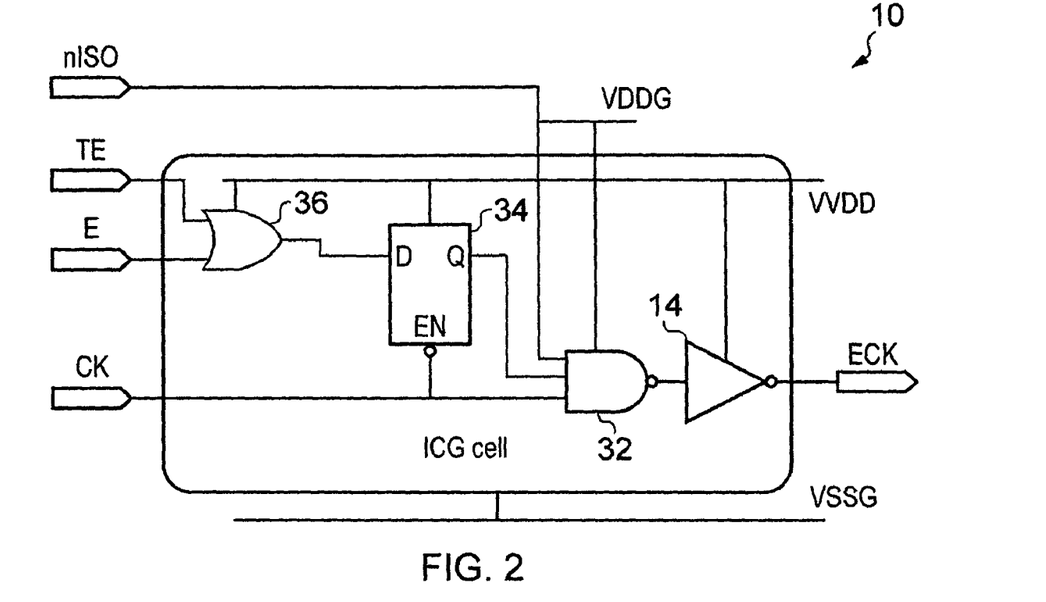
FIG. 2 shows a clock gating cell according to an embodiment of the present invention.

FIG. 2 shows a further example of a clock gating cell 10 according to an embodiment of the present invention. In this embodiment logic circuitry 12 comprises NAND gate 32. There is also a latching circuit 34 and an OR gate 36. This clock gating cell has an additional input to the previous embodiment of a test enable signal. This test enable signal enables a test mode to be entered. During the test mode data is clocked through the system and analysed. During this test mode the clock should be operational and thus, the test mode enable signal and the clock enable signal both require the clock to be operational and are combined to form a single signal that indicates this. This combined signal is latched to avoid its value changing in the high phase of the clock and thereby causing glitches.

NAND gate 32 receives the ISO signal for which a logical 0 indicates low power mode, it also receives the combined test enable and clock enable signal from latch 34 and a clock signal. If any of the input signals to NAND gate 32 are low then a high signal is output as the clock gated signal. Thus, if the low power mode signal is low a constant high signal is output and the clock signal is gated. Similarly if the latch output is low a high signal is output by NAND gate 32 and the clock signal is gated. If either the test enable or clock enable signal is high and the ISO signal is high then it is the clock signal, or rather the inverted clock signal, that is output by NAND gate 32. The signal output from NAND gate 32 is inverted by inverter 14 and thus, as a logical one is output by NAND gate 32 as the clock gated value then the inverter 14 will output a logical zero.

In this embodiment, the NAND gate 32 is powered by the high voltage rail VDDG. The other elements within this clock gating cell are powered by a virtual power rail VVDD. In low power mode the virtual power rail VVDD is powered down and thus, the elements powered by this power rail are also powered down. There is a shared ground rail shared by all the elements within the cell. Thus, in low power mode only the logic gate 32 is powered and a logical zero is output.

Figure 3:
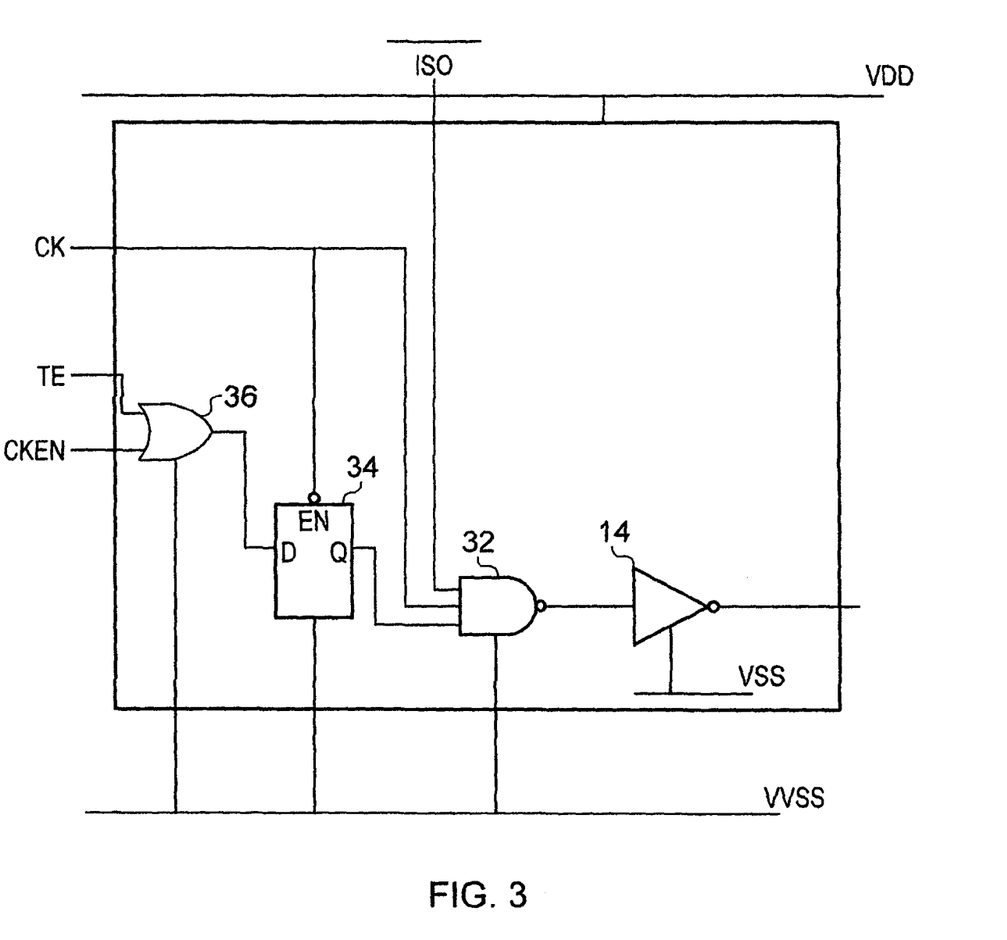
FIG. 3 shows a clock gating cell with a virtual low power rail according to an embodiment of the present invention.

FIG. 3 shows an alternative embodiment similar to the embodiment of FIG. 2 except that in this embodiment the virtual rail is the low power rail VVSS. In low power mode this is powered down. Thus, in low power mode the circuit receives a logical one from the high power rail VDD. In this embodiment, NAND gate 32, latch 34 and OR gate 36 are all powered by the virtual low power rail and thus are powered down in the low power mode. Inverter 14 in this embodiment is powered by the low power rail itself and therefore retains its power. When the other elements are powered down a logical one is input to inverter 14 as the circuitry is still receiving power from the high voltage rail. Thus, as in the previous embodiment a logical 0 is output.

Figure 4:
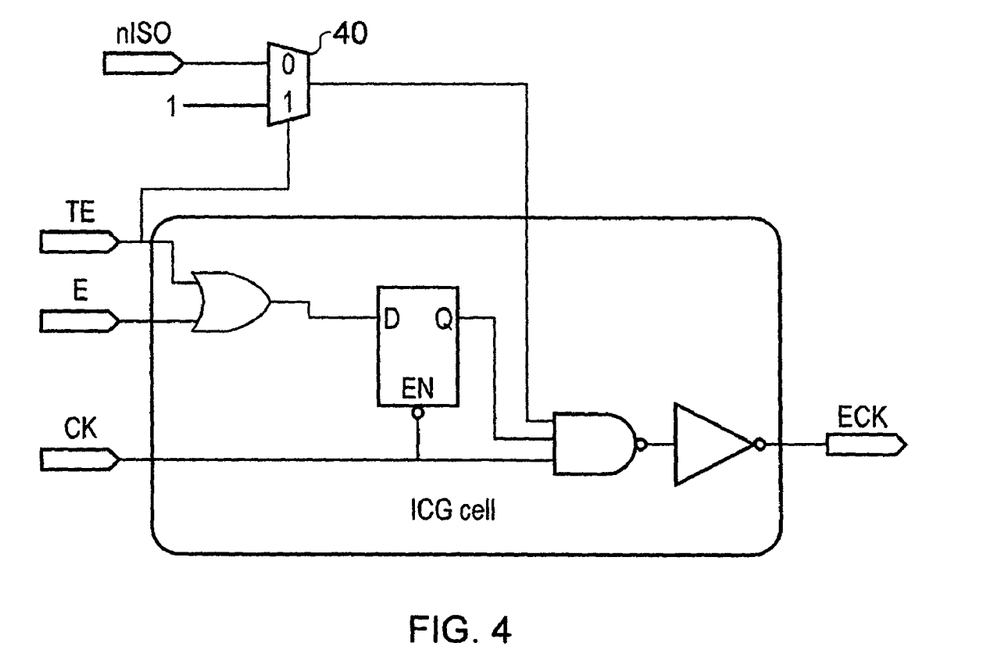
FIG. 4 shows a clock gating cell with a test enable override circuit.

FIG. 4 shows a clock gating cell according to a further embodiment of the present invention. This clock gating cell is similar to the cell of FIG. 2 but has override circuitry in the form of multiplexer 40. This circuitry is responsive to the test enable signal being asserted to override the low power mode signal input to NAND gate 32, such that during test mode the clock cannot be gated. This may be important as during test mode the clock signal should not be gated.

Figure 5:
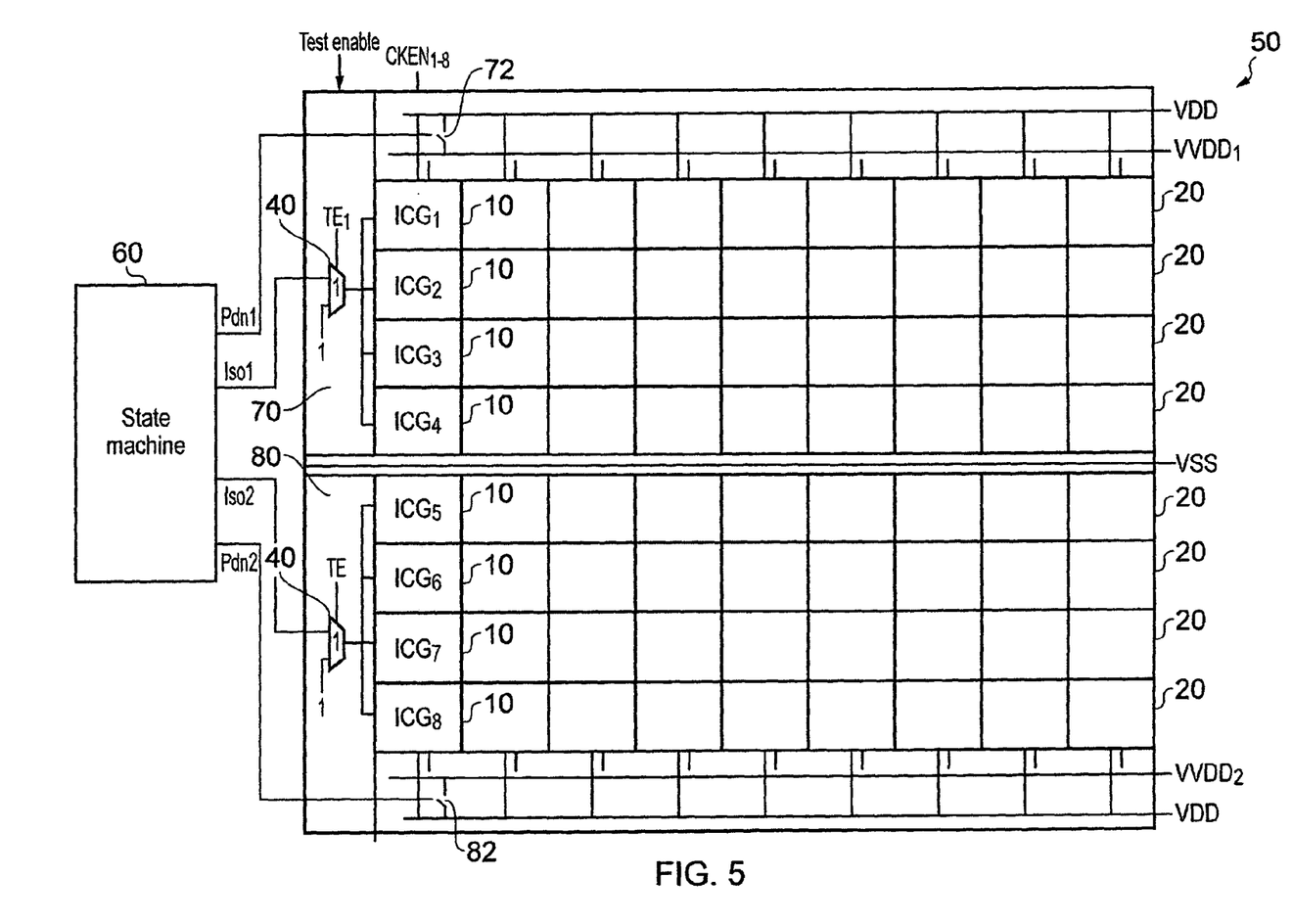
FIG. 5 shows an integrated circuit according to an embodiment of the present invention.

FIG. 5 shows an integrated circuit 50 according to an embodiment of the present invention. This integrated circuit is formed of a plurality of clock gating cells ICG 10 which each supply clock signals to associated state retention elements 20, which in this embodiment are in the same row as the ICG 10. These state retention elements 20 form a register and thus, each clock gating cell 10 controls a clock signal to a particular register. In this way, when a register is being addressed the clock signal to this register is enabled and the clock gating cell 10 corresponding to the register being addressed will supply a clock signal to that register.

Thus, integrated circuit 50 receives clock enable signals CKEN 1 to 8 for the respective clock gating cells ICG 1 to 8 corresponding to the 8 registers shown. These clock enable signals are generated by the processing unit in response to the address of the corresponding register being accessed.

Integrated circuit 50 is divided in this embodiment into two power domains 70, 80. It will be clear to a skilled person that it could be divided into many more but for the sake of simplicity two are shown here. These power domains 70, 80 are controlled by signals from a state machine 60 which acts as a power controller. State machine 60 generates isolation signal ISO1 and isolation signal ISO2 which it sends to the respective power domains 70, 80. It also generates power down signal pdn1 and power down signal pdn2 and sends these to the respective power domains 70, 80. The isolation signals ISO1 and 1502 are supplied to the clock gating cells 10 and in response to these signals the clock gating cells 10 generate the gated clock signals. The power down signals pdn1 and pdn2 are sent to switching circuitry 72, 82 associated with the virtual power rails VVDD1 and VVDD2 and in response to these signals the respective switching circuitry 72, 82 acts to isolate the respective virtual power rail from the power supply and thereby power down the portions of the circuit that are powered by the virtual power rails.

The isolation signals and power down signals are not the same signal but are related to each other. They are not the same signal as it is important that the clock gating cells 10 gates the clocks sent to the state retention cells 20 before any elements are powered down otherwise data will be lost from state retention cells. Thus the state machine 60 generates the isolation ISO signals before the corresponding power down pdn signals.

In this embodiment the ISO signals are transmitted via override circuitry 40 to ICG elements 10. Override circuitry 40 also receives a test enable signal as a select signal and this acts to override the ISO signal if the test enable signal indicates that test mode is active and forces it to a logical one indicating functional mode rather than low power mode. In test mode it is important that the clock is not gated and in this embodiment there is a single override circuit 40 for each power domain 70, 80.

Each of the cells within integrated circuit 50 are powered either by the high power rail VDD of by the virtual power rail VVDD. If they are powered by the virtual power rail VVDD then in response to the power down signal pdn the respective virtual power rail is disconnected from the high power rail and the elements powered by it are powered down. In this embodiment at least a portion of the state retention cells 20 and portions of the clock gating cells 10 are powered down.

The state retention cells 20 may be simple latching elements with a transmission gate at the input, or they may be master slave flip-flops such as is shown in FIG. 1. Alternatively they may be memory cells. In any of these cases the gated clock signal acts to isolate any state retention elements that are powered in the low power mode from any elements that are powered down.

In the embodiment of FIG. 5, the integrated circuit 50 is formed of standard cells 10, 20 that occupy a predetermined area. Thus, state retention cells 20 are standard cells as are clock gating cells 10.

Figure 6:
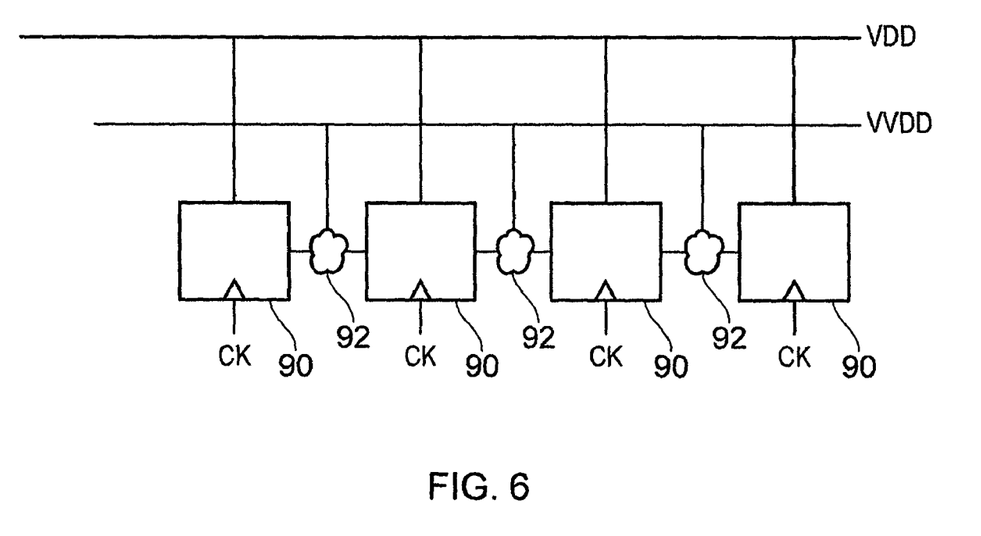
FIG. 6 shows a circuit comprising registers connected by combinational circuitry.

FIG. 6 shows a plurality of registers 90 with combinational circuitry 92 arranged between the registers, the combinational circuitry 92 performing data processing operations on the data stored in the registers 90. On entry to a low power mode it may be desirable to retain the data stored in the registers, but not to process it any more. In such a case, clock gating circuitry such as is shown in FIG. 2 for example, may transmit a predetermined gated value to the registers such that they no longer receive and output data in response to a clock signal. When this has been done the virtual power rail will be powered down and the combinational circuitry used in functional mode to perform data processing operations that is powered by this virtual power rail will also be powered down. The registers will retain data as the clock signal will have been gated and the input to the latching mechanism of the register will be in a high impedance state. It should be noted that in other embodiments both the to combinational circuitry and some of the registers may be powered down, while others of the registers may retain state.

Figure 7:
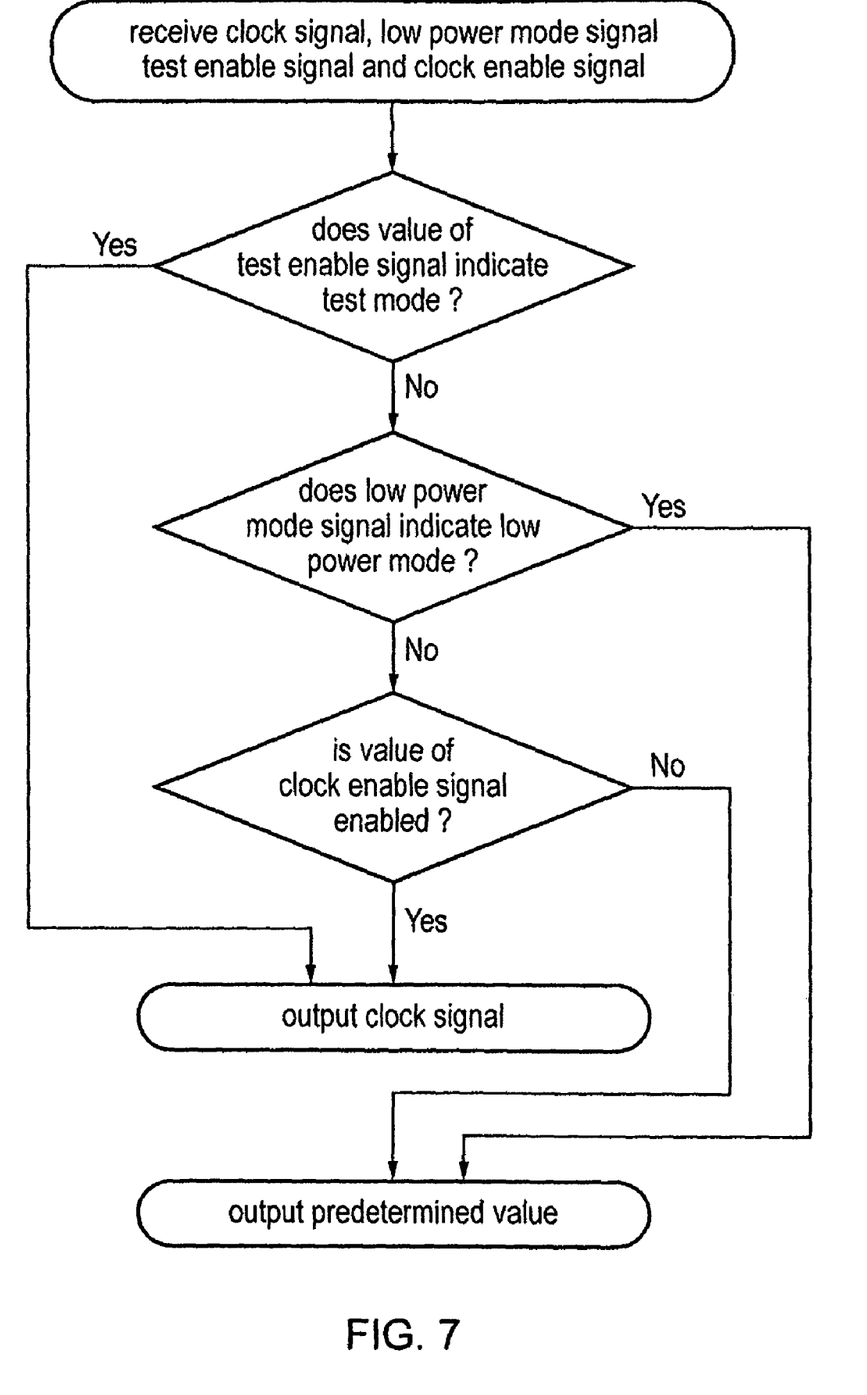
FIG. 7 shows a flow diagram illustrating steps in a method according to an embodiment of the present invention.

FIG. 7 shows a flow diagram illustrating steps in a method according to an embodiment of the present invention. In this embodiment, the override circuitry for the test mode enable signal is within the clock gating cell. Thus, the cell receives the clock enable signal, the clock signal, the low power mode signal and the test enable signal.

If the test enable signal indicates test mode then the clock signal is output.

If the test enable signal does not indicate a test mode and the low power signal indicates low power mode then the clock signal is gated and the predetermined value is output.

If the test enable signal does not indicate test mode and the low power signal does not indicate low power mode and if the clock enable signal does not have an enable value then the clock gating cell outputs the predetermined data value. If the test enable signal does not indicate test mode and the low power signal does not indicate low power mode and if the clock enable signal does have an enable value then the clock gating cell outputs the clock signal.

Figure 8:
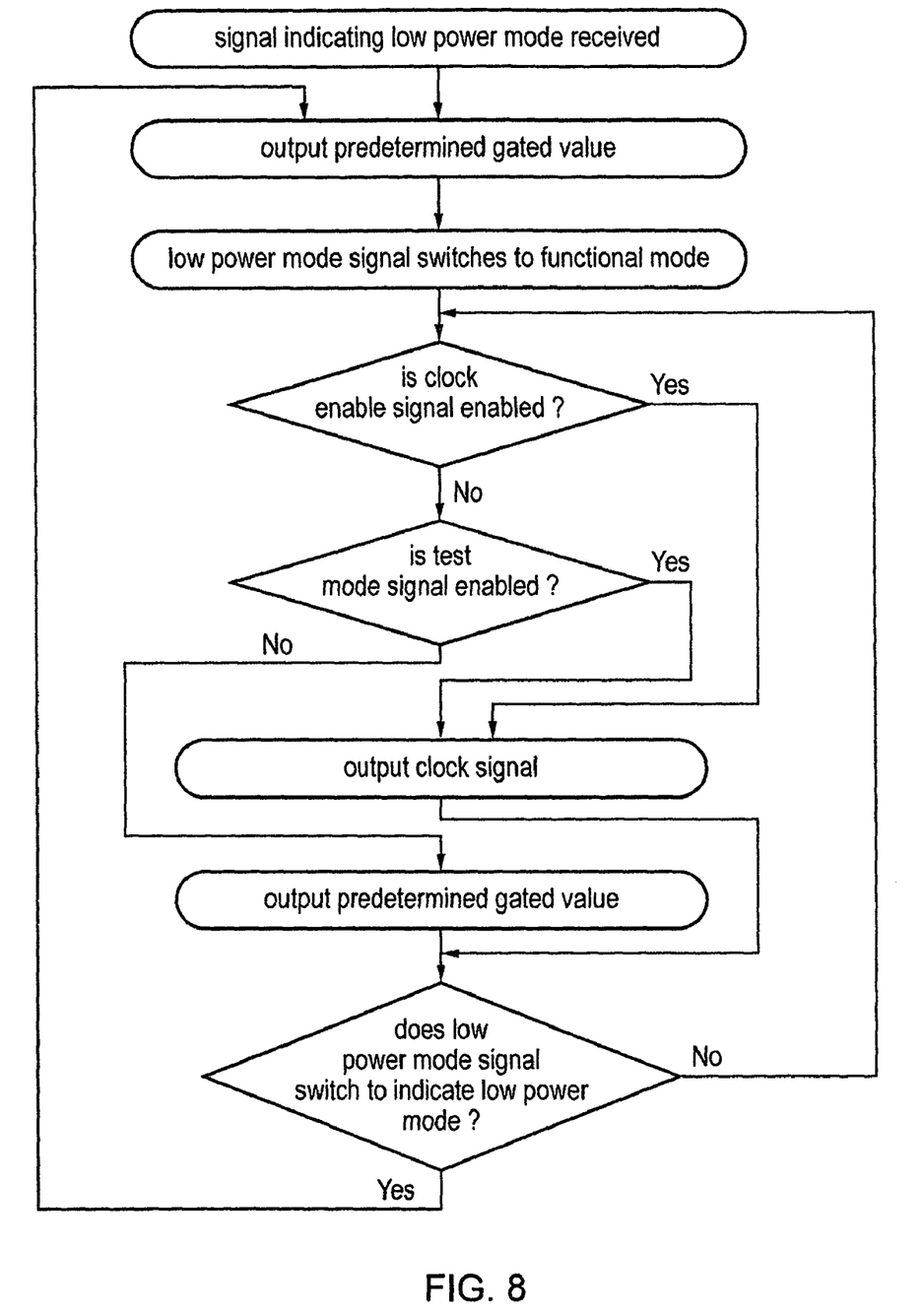
FIG. 8 shows a flow diagram illustrating steps in a further method according to embodiment of the present invention.

FIG. 8 shows a further embodiment where the override circuit is outside of the clock gating cell. In this embodiment if the low power mode signal indicates a low power mode then the predetermined value is output. If the low power mode signal as been received by the cell then much of the circuitry may be powered down and the values of the other signals will not be known, thus, receipt of this signal will cause the predetermined gated value to be output.

If the low power mode signal switches to a functional mode value then the other enable signals are considered. If the value of the clock enable signal is enabled then the clock signal is output. Similarly if the test enable signal indicates test mode the clock signal is output. If the test mode enable signal is not enabled and the clock enable signal is not enabled then the predetermined gated value will be output.

The values are continually monitored and as they change the signal output via the clock gating cell will change.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defiled by the appended claims. For example, various combinations of the features of the following dependent claims could be made with the features of the independent claims without departing from the scope of the present invention.

We claim:

1. Clock gating circuitry unit for supplying either a clock signal or a predetermined gated value to a plurality of synchronous elements within an integrated circuit, said integrated circuit comprising said plurality of synchronous elements and combination circuitry, said clock gating circuitry unit being configured to receive an input clock signal and to output an output signal comprising either said clock signal or said predetermined gated value, said clock gating circuitry unit comprising:
   a clock input for receiving said input clock signal;
   a clock enable signal input for receiving a clock enable signal having either an enable value indicating said plurality of synchronous elements are currently functional and are to be clocked, or a disable value indicating said plurality of synchronous elements are currently not required and are not to be clocked;
   a power mode signal input for receiving a low power mode signal having either a low power value indicating entry to a low power mode in which at least a portion of said plurality of synchronous elements are powered to retain data and are not clocked and at least one of: a further portion of said plurality of synchronous elements and at least a portion of said combinational circuitry are powered down, or a functional mode value indicating said plurality of synchronous elements and said combinational circuitry are to be powered;
   logic circuitry configured in response to said clock enable signal having said enable value and to said low power mode signal having said functional mode value to output said clock signal and in response to at least one of said clock enable signal having said disable value and said low power mode signal having said low power value to output said predetermined gated value.

2. Clock gating circuitry unit according to claim 1, said clock gating circuitry unit further comprising output buffer circuitry for receiving a signal output by said logic circuitry and for outputting said output signal.

3. Clock gating circuitry unit according to claim 1, said clock gating circuitry unit further comprising:
   latching circuitry configured to latch said received clock enable signal and to output said latched clock enable signal to said logic circuitry.

4. Clock gating circuitry unit according to claim 1, said clock gating circuitry unit being configured to receive power from two power supply means, at least some circuitry within said clock gating circuitry unit receiving power from a first power supply means and at least some other circuitry within said clock gating circuitry unit receiving power from a second power supply means, said second power supply means being configured not to supply power to said at least some other circuitry in said low power mode.

5. Clock gating circuitry unit according to claim 4, wherein said predetermined gated value comprises a logical zero, said logic circuitry being powered by said first power supply means and other elements of said clock gating circuitry unit being powered by said second power supply means, wherein in said low power mode said first power supply means supplies power to said logic circuitry and said second power supply means does not supply power to said other elements such that said other elements are powered down.

6. Clock gating circuitry unit according to claim 4, wherein said clock gating circuitry unit further comprises output buffer circuitry comprising an inverter for receiving a signal output by said logic circuitry and for outputting said output signal and said predetermined gated value comprises a logical one, and said first and second power supply means each comprise a high voltage rail and a low voltage rail, said logic circuitry being powered by said first power supply means and other elements of said clock gating circuitry unit being powered by said second power supply means, said low voltage rail of said second power supply means being isolated from a low voltage supply in said low power mode.

7. Clock gating circuitry unit according to claim 4, wherein said clock gating circuitry unit further comprises output buffer circuitry comprising an inverter for receiving a signal output by said logic circuitry and for outputting said output signal and said predetermined gated value comprises a logical zero, and said first and second power supply means each comprise a high voltage rail and a low voltage rail, said first power supply means supplying power to said output buffer circuitry within said clock gating circuitry units, and said second power supply supplying power to other elements within said clock gating circuitry unit, said low voltage rail of said second power supply means being isolated from a low voltage supply in said low power mode.

8. Clock gating circuitry unit according to claim 1, further comprising a test mode enable signal input for receiving a test mode enable signal indicating entry to a test mode and combining circuitry for combining said test mode enable signal and said clock enable signal, wherein in response to either said test mode enable signal having said test mode enable value or said clock enable signal having said enable value said combined value has a value of said enable value; and
latching circuitry configured to latch said combined signal and to output said latched combined signal to said logic circuitry.

9. Clock gating circuitry unit according to claim 8, said clock gating circuitry unit comprising overriding circuitry, said overriding circuitry being configured in response to said test mode enable signal having said test mode enable value to override said low power mode signal input to said logic circuitry and to hold said signal at said functional mode value.

10. Clock gating circuitry unit according to claim 2, wherein said logic circuitry comprises a NAND gate and said output buffer comprises an inverter.

11. An integrated circuit comprising:
synchronous elements clocked by said clock signal;
combinational circuitry;
a plurality of clock gating circuitry units according to claim 1, each configured to provide either said clock signal or said gated predetermined value to a respective plurality of said synchronous elements; and
power supply means configured to supply power to said synchronous elements and said plurality of clock gating circuitry units, said power supply means being configured such that in response to a signal indicating said low power mode said power supply means supplies power to a portion of said synchronous elements such that they retain data and does not supply power to at least one of: a further portion of said synchronous elements and at least a portion of said combinational circuitry such that they are powered down;
said plurality of clock gating circuitry units being configured in response to said low power mode signal having said low power value to supply said predetermined gated value to said portion of synchronous elements powered to retain data.

12. An integrated circuit according to claim 11, wherein said respective plurality of synchronous elements comprise state storage elements.

13. An integrated circuit according to claim 11, wherein said power supply means comprises a first power rail for supplying power to said portion of said synchronous elements and a second power rail for supplying power to said further portion of said synchronous elements, wherein at least some circuitry within at least some of said plurality of clock gating circuitry units receive power from said first power rail and at least some other circuitry within at least some of said plurality of clock gating circuitry units receive power from said second power rail, said second power rail being configured to be isolated from a power source and not to supply power in said low power mode.

14. An integrated circuit according to claim 13, wherein said at least some other circuitry comprise an output buffer circuitry for receiving a signal output by said logic circuitry and for outputting said output signal and said at least some circuitry comprises said logic circuitry, and said predetermined gated value comprises a logical zero.

15. An integrated circuit according to claim 14, wherein said at least some other circuitry comprises all circuitry within said at least some clock gating circuitry units other than said logic circuitry.

16. An integrated circuit according to claim 11, said integrated circuit further comprising overriding circuitry associated with a plurality of said clock gating circuitry units, said overriding circuitry being configured in response to said test mode enable signal having said test mode enable value to override said low power mode signal input to said plurality of clock gating circuitry units and to hold said signal at said functional mode value.

17. A standard cell representing a functional component to be provided within a placement area of a predetermined size and having predetermined boundary conditions on an integrated circuit, said functional component being a clock gating component, said standard cell being configured to have:
a clock signal input for receiving a clock signal;
a clock enable signal input for receiving a clock enable signal having either an enable value indicating said plurality of synchronous elements are currently functional and are to be clocked, or a disable value indicating said plurality of synchronous elements are currently not required and are not to be clocked;
a power mode signal input for receiving a low power mode signal having either a low power value indicating entry to a low power mode in which at least a portion of said plurality of synchronous elements are powered to retain data and are not to be clocked and at least one of: a further portion of said plurality of synchronous elements and combinational circuitry for processing data stored by said synchronous elements are powered down, or a functional mode value indicating said plurality of synchronous elements and combinational circuitry are to be powered;
logic circuitry configured in response to said clock enable signal having said enable value and to said low power mode signal having said functional mode value to output said clock signal and in response to at least one of said clock enable signal having said disable value and said low power mode signal having said low power value to output said predetermined gated value.

18. A standard cell according to claim 17, said standard cell further comprising:
output buffer circuitry for receiving a signal output by said logic circuitry and for outputting either said clock signal or said predetermined gated value.

19. A standard cell according to claim 17, wherein said standard cell is configured to receive power from two power supply means, at least some circuitry within said standard cell receiving power from a first power supply means and at least some other circuitry within said standard cell receiving power from a second power supply means, said second power supply means being configured not to supply power to said at least some other circuitry in said low power mode.

20. A standard cell according to claim 18, wherein said predetermined gated value is a logical zero and said at least some other circuitry comprises said output buffer circuitry.

21. A standard cell according to claim 19, wherein said at least some other circuitry comprises all circuitry within said at least some clock gating circuitry units other than said logic circuitry.

22. A computer program on a non-transitory storage medium providing a standard cell as claimed in claim 17.

23. A method of supplying either a clock signal or a predetermined gated value to a plurality of synchronous elements within an integrated circuit said integrated circuit comprising said plurality of synchronous elements and combination circuitry, said method comprising:
receiving an input clock signal;
receiving a clock enable signal having either an enable value indicating said plurality of synchronous elements are currently functional and are to be clocked, or a disable value indicating said plurality of synchronous elements are currently not required and are not to be clocked;

receiving a low power mode signal having either a low power value indicating entry to a low power mode in which at least a portion of said plurality of synchronous elements are powered to retain data and are not to be clocked and at least one of a further portion of said plurality of synchronous elements and at least a portion of said combinational circuitry are powered down, or a functional mode value indicating said plurality of synchronous elements and said combinational circuitry are to be powered;

in response to said clock enable signal having said enable value and to said low power mode signal having said functional mode value outputting said clock signal; and in response to at least one of said clock enable signal having said disable value and said low power mode signal having said low power value outputting said predetermined gated value.

24. Clock gating means for receiving a clock signal and for outputting an output signal comprising either said clock signal or a predetermined gated value to a plurality of synchronous means for storing data within an integrated circuit, said integrated circuit comprising said plurality of synchronous elements and combinational circuitry, said clock gating means comprising:

a clock input means for receiving said clock signal;

a clock enable signal input means for receiving a clock enable signal having either an enable value indicating said plurality of synchronous elements are currently functional and are to be clocked, or a disable value indicating said plurality of synchronous elements are currently not required and are not to be clocked;

a power mode signal input means for receiving a low power mode signal having either a low power value indicating entry to a low power mode in which at least a portion of said plurality of synchronous elements are powered to retain data and are not clocked and at least one of: a further portion of said plurality of synchronous elements and at least a portion of said combinational circuitry are powered down, or a functional mode value indicating said plurality of synchronous elements and said combinational circuitry are to be powered;

logic means for outputting said clock signal in response to said clock enable signal having said enable value and to said low power mode signal having said functional mode value and for outputting said predetermined gated value in response to at least one of said clock enable signal having said disable value and said low power mode signal having said low power value.

* * * * *